UNITED STATES PATENT OFFICE.

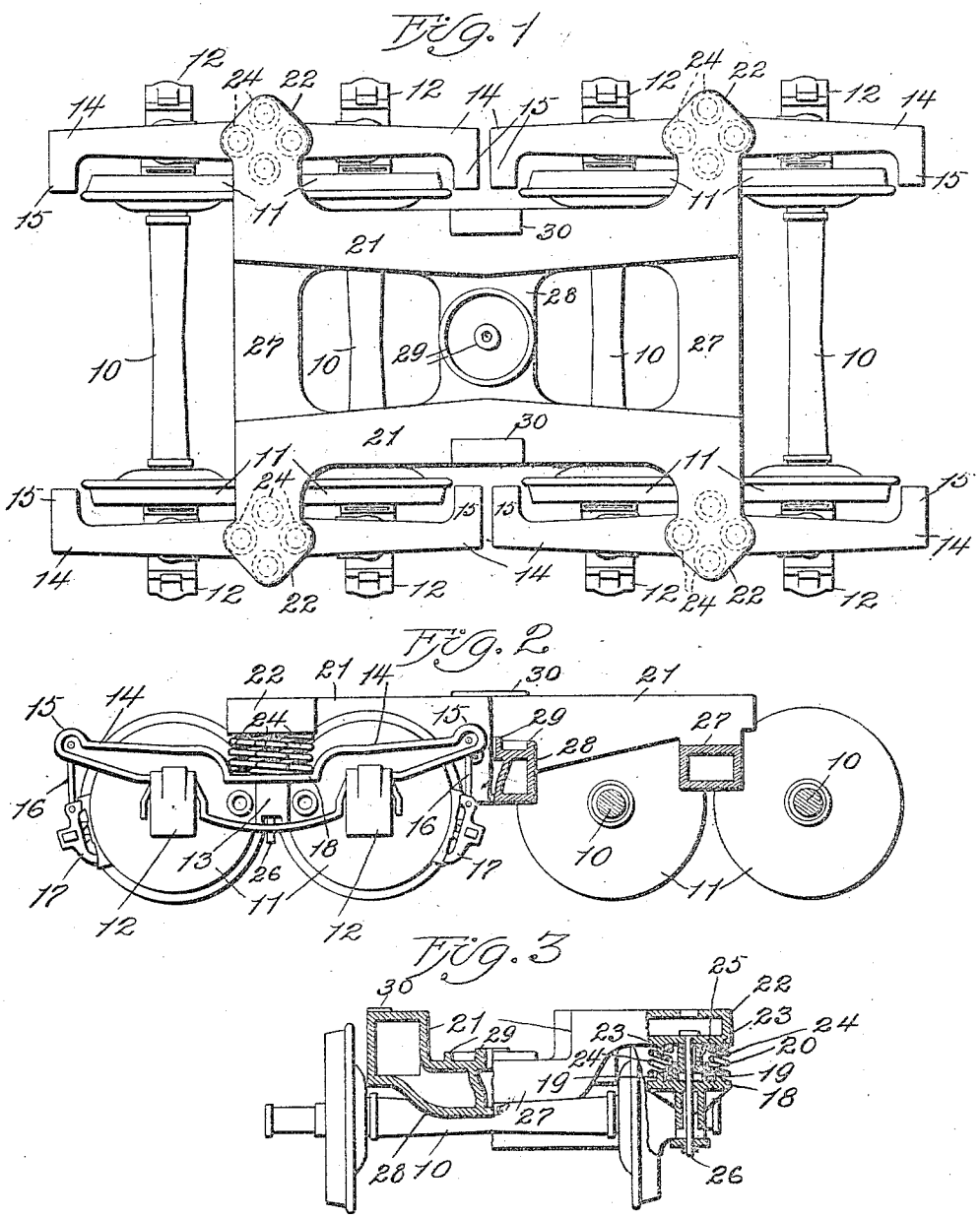

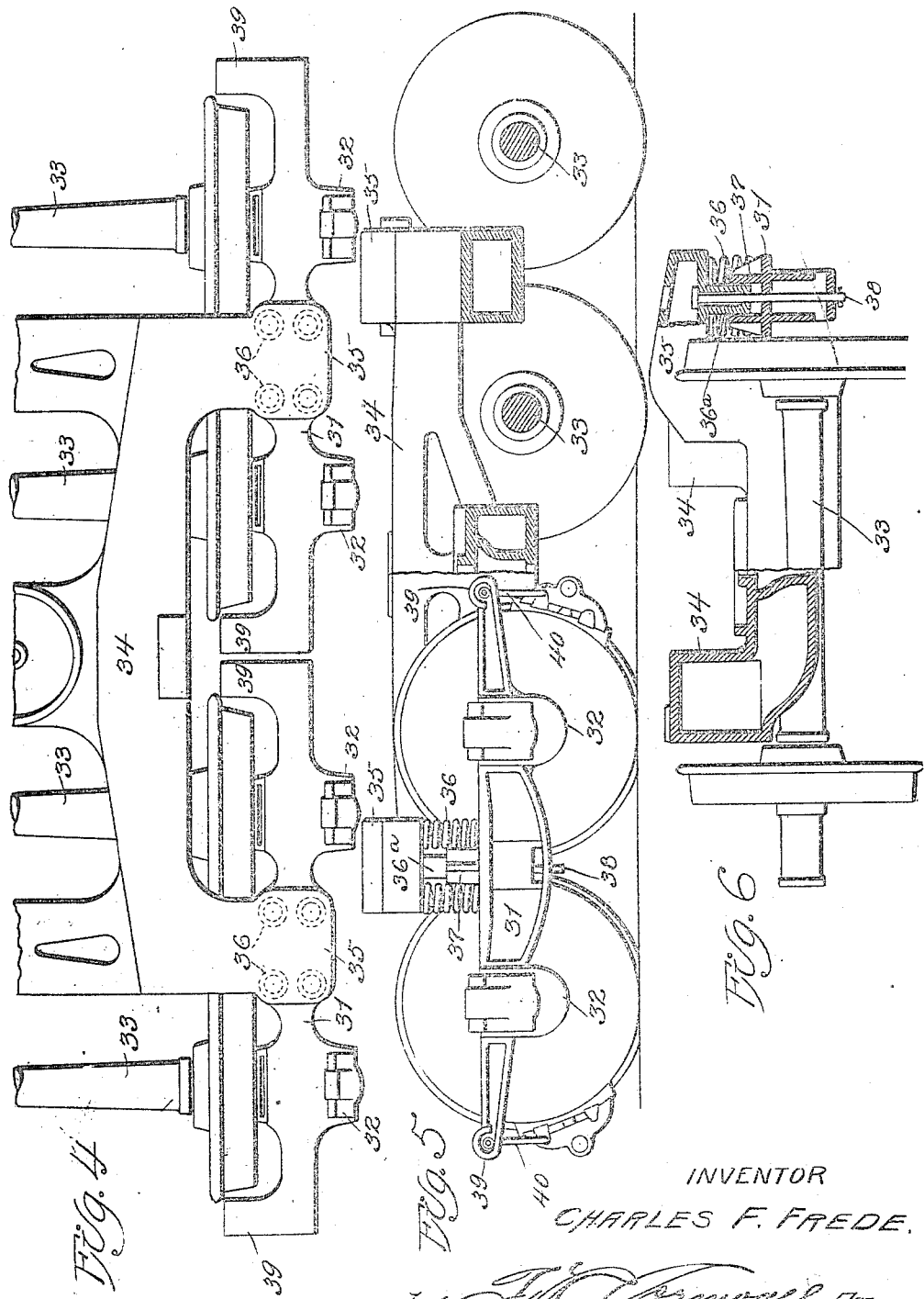

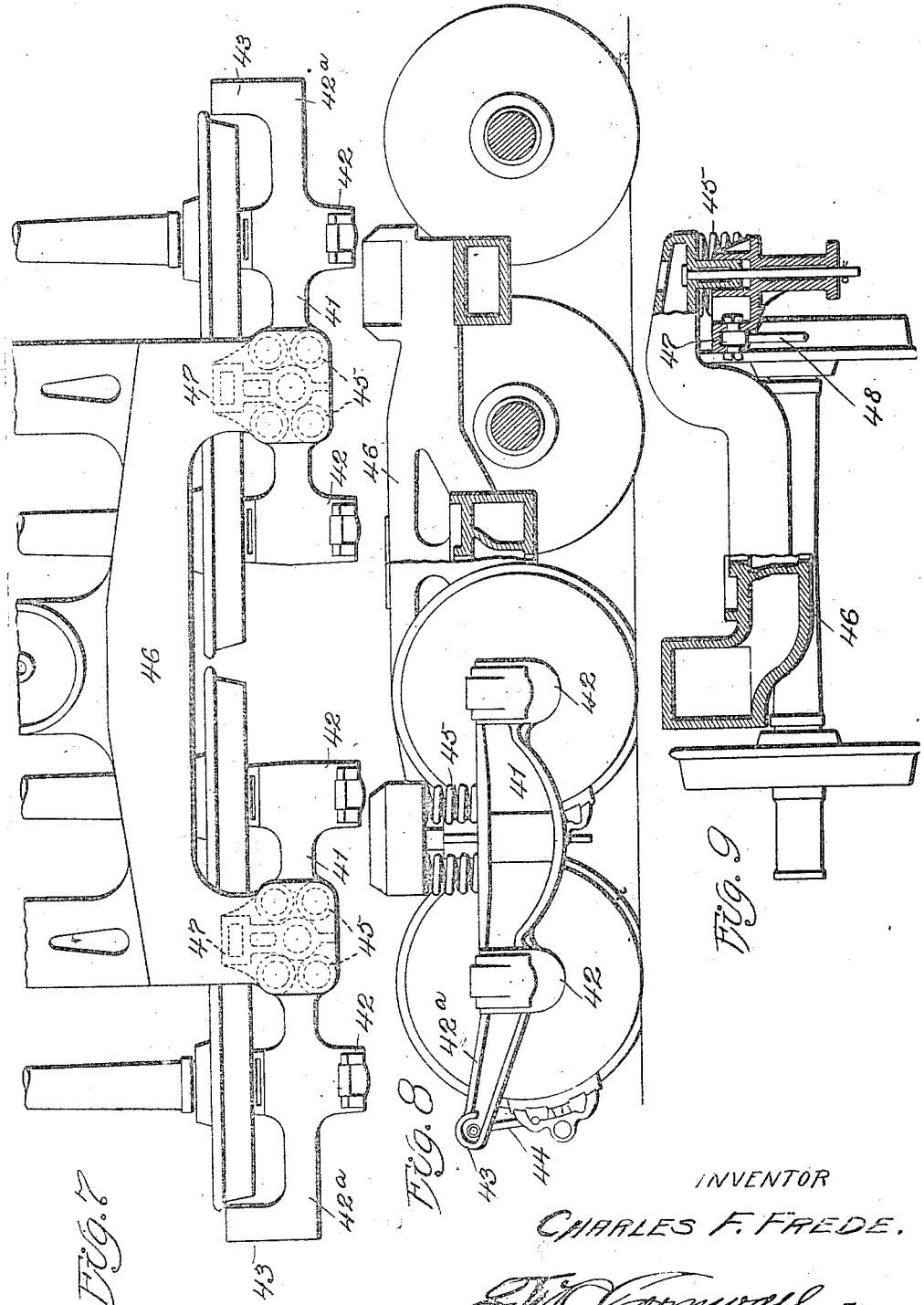

CHARLES F. FREDE, OF ST. LOUIS, MISSOURI, ASSIGNOR TO COMMONWEALTH STEEL COMPANY, OF ST. LOUIS, MISSOURI, A CORPORATION OF NEW JERSEY.

CAR-TRUCK.

1,276,636.  Specification of Letters Patent.  Patented Aug. 20, 1918.

Application filed January 5, 1918.  Serial No. 210,446.

*To all whom it may concern:*

Be it known that I, CHARLES F. FREDE, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification.

My invention relates generally to railway car trucks, and more particularly to an eight-wheel truck which is designed for relatively heavy freight service.

The principal objects of my invention are, to provide a comparatively strong truck having the requisite flexibility and in which the associated parts are arranged so that the loads impressed on the truck frame will be equally divided upon the four axles thereof; to provide a car truck having a center bolster which is yieldingly supported upon the truck side frames, the latter being formed in pairs and resting upon, and in some instances formed integral with, the journal boxes, and further, to arrange on the truck side frames inwardly projecting brackets or extensions which provide supports for brake hangers.

With the foregoing and other objects in view, my invention consists in certain novel features of construction and arrangement of parts, hereinafter more fully described and claimed, and illustrated in the accompanying drawings, in which—

Figure 1 is a top plan view of an eight-wheel truck of my improved construction.

Fig. 2 is a side elevational view of the truck, a portion thereof being in vertical section.

Fig. 3 is an end elevational view of the truck with parts thereof in section.

Fig. 4 is a top plan view of the side portion of a modified form of the truck.

Fig. 5 is an elevational view partly in section of the form of truck illustrated in Fig. 4.

Fig. 6 is an end elevational view partly in section of the modified form of truck illustrated in Figs. 4 and 5.

Fig. 7 is a top plan view of a further modified form of the truck.

Fig. 8 is a side elevational view of the form of truck illustrated in Fig. 7 with parts in vertical section.

Fig. 9 is an end elevational view partly in section of a modified form of truck illustrated in Figs. 7 and 8.

Referring by numerals to the accompanying drawings, and particularly Figs. 1, 2 and 3, which illustrate a practical embodiment of my invention, 10 designates railway car axles of the usual form and construction, the same being provided with wheels 11 and having their ends mounted in the usual journal boxes 12. Positioned on each pair of journal boxes 12 is a truck side frame, preferably cast and comprising a central portion 13 which is disposed between the pair of journal boxes, and formed integral with said central portion 13 are end portions 14 which overlie the journal boxes and are secured thereto in any suitable manner.

Formed integral with or fixed to the outer ends of the portions 14 are inwardly projecting brackets 15, the same serving as points of attachment for the upper ends of brake hangers 16, the latter supporting the usual beams and brake heads 17.

Formed integral with the top of the central portion 13 of each side frame is a horizontally disposed plate 18 and formed integral therewith and projecting upwardly therefrom is a series of spring centering pins 19. Formed integral with said plate between said pins is an upwardly projecting cylindrical bearing 20.

The center bolster of my improved truck is preferably cast in a single piece and includes a pair of side members 21, the same lying parallel with each other and with the truck side frames, said side members being hollow and preferably square or box-shape in cross section, and formed integral with the ends of said side members are outwardly projecting arms 22, the terminal portions of which are positioned directly above the plates 18.

Formed integral with these arms 22 are depending spring centering pins 23, the same being in direct alinement with the pins 19 on plate 18. Interposed between each plate 18 and the corresponding arm 22 is a series of heavy coil springs 24, the ends thereof being positioned upon the centering pins 19 and 23. Formed integral with each arm 22 and between the pins 23 thereon is a depending cylindrical lug 25, the same being loosely mounted in the corresponding cylindrical bearing 20 and passing downwardly through this cylindrical lug through the central portion of side frame member 13 is a bolt 26. These bolts serve as ties between the arms 22 and the truck side frames and also serve to limit the upward movement of the center bolster with respect to said side frames.

Connecting the end portions of side members 21 of the center bolster are end rails 27, the same being preferably depressed or occupying a plane slightly below the plane occupied by said members 21 and uniting the center portions of said members 21 is a transverse member 28 on top of which is formed concentric center bearing rings 29. This member 28 is preferably depressed or arranged in a plane below that occupied by side members 21.

Formed on top of the side members 21 and preferably near the outer edges thereof are side bearings 30.

In the modified form of the truck illustrated in Figs. 4, 5 and 6, each side frame 31 is formed integral with a pair of journal boxes 32, the latter receiving in the usual manner the end of the wheel carrying axles 33. The side members 34 of a one-piece center bolster are provided at their ends with outwardly projecting arms 35 which rest directly on compression springs 36, the latter bearing on top of the central portions of side frames 31. The center bolster is guided for vertical movement upon the side frames by lugs 36ª which depend from arms 35 and engage in bearings 37 formed on the tops of side frames 31 and said center bolster and side frames being tied together by bolts 38 which pass through the lugs 36 and through the central portions of the side frames. In this form of the truck the end portions of the side frames are extended inwardly as designated by 39 to provide points of attachment for the usual brake hangers 40.

In the modification illustrated in Figs. 7, 8 and 9, the truck side frames 41 have formed integral therewith the journal boxes 42 and projecting outwardly from the outer journal box on each side frame or from the journal boxes which accommodate the ends of the outer or end pair of axles are extensions 42ª, the ends of which are provided with inwardly projecting brackets 43. These brackets serve as points of attachment for the usual brake hangers 44.

In this construction, the top of the central portion of each side frame 41 serves as a support for a series of springs 45, which latter constitute a yielding support for the center bolster 46, the latter being substantially of the same construction as hereinbefore described.

Formed integral with the central portions of the side frames 41 and on the inside thereof are inwardly projecting brackets 47, the same serving as points of attachment for the upper ends of hangers 48, which latter support the brake beams for the inside wheels of the truck.

A car truck of my improved construction is comparatively simple, can be easily assembled or taken apart, thereby greatly facilitating repairs and by mounting the center bolster directly upon springs which are carried by the truck side frames and utilizing two pairs of side frames for the four axles, a truck having a relatively high degree of flexibility is produced. This flexibility is further enhanced by virtue of the fact that each side frame is entirely independent of the others in both construction and operation.

It will be readily understood that minor changes in the size, form and construction of the various parts of my improved car truck can be made and substituted for those herein shown and described, without departing from the spirit of my invention, the scope of which is set forth in the appended claims.

I claim:

1. In a car truck, two pairs of wheel carrying axles, a pair of separately formed and independently acting truck side frames for each pair of axles, springs supported by said truck side frames and a center bolster supported by said springs.

2. In a car truck, two pairs of wheel carrying axles, a pair of separately formed and independently acting truck side frames for each pair of axles, and a center bolster yieldingly supported by said truck side frames.

3. In a car truck, two pairs of wheel carrying axles, a pair of separately formed and independently acting truck side frames for each pair of axles, and a center bolster yieldingly supported by said truck side frames, said center bolster and side frames being connected and guided for relative vertical movement.

4. In a car truck, two pairs of wheel carrying axles, a pair of separately formed and independently acting truck side frames for each pair of axles, a center bolster yieldingly supported by said truck side frames, and brake hanger brackets on said side frames.

5. In a car truck, two pairs of axles, journal boxes for said axles, said journal boxes being connected in pairs by separately formed and independently acting truck side frames, and a center bolster yieldingly supported upon said truck side frames.

6. In a car truck, two pairs of axles, journal boxes for said axles, said journal boxes being connected in pairs by separately formed and independently acting truck side frames, a center bolster yieldingly supported upon said truck side frames, and brake hanger brackets on said truck side frames.

7. In a car truck, two pairs of wheel carrying axles, a pair of separately formed and independently acting truck side frames for each pair of axles, journal boxes associated with said truck side frames, and a center bolster yieldingly supported upon said side frames.

8. In a car truck, two pairs of wheel carrying axles, a pair of separately formed and independently acting truck side frames for each pair of axles, journal boxes associated with said truck side frames, and a center bolster yieldingly supported upon said side frames, said side frames and center bolster being connected and guided for relative vertical movement.

9. In a car truck, two pairs of wheel carrying axles, a pair of separately formed and independently acting truck side frames for each pair of axles, journal boxes associated with said truck side frames, a center bolster yieldingly supported upon said side frames, said side frames and center bolster being connected and guided for relative vertical movement, and brake hanger brackets on said side frames.

10. In a car truck, the combination with four wheel carrying axles, of two pairs of separately formed and independently acting truck side frames associated with said axles, and a center bolster yieldingly supported by said side frames.

11. In a car truck, the combination with four wheel carrying axles, of two pairs of truck side frames associated with said axles, springs on said side frames, and a center bolster supported by said springs.

12. In a car truck, the combination with four wheel carrying axles, of four separately formed and independently acting truck side frames associated with said axles, a pair of journal boxes associated with each truck frame, and a center bolster yieldingly supported by said side frames.

13. In a car truck, the combination with four wheel carrying axles, of four truck side frames associated with said axles, a pair of journal boxes associated with each truck frame, a center bolster, and compression springs interposed between said bolster and side frames.

14. In a car truck, the combination with four wheel carrying axles, of four truck side frames associated with said axles, a pair of journal boxes associated with each truck frame, a center bolster, compression springs interposed between said bolster and side frames, and brake hanger brackets on said side frames.

15. In a car truck four wheel carrying axles, four separately formed and independently acting side frames associated with said axles, and a center bolster yieldingly supported by said side frames.

16. In a car truck four wheel carrying axles, four separately formed and independently acting side frames associated with said axles, a center bolster yieldingly supported by said side frames, and brake hanger supporting brackets on said side frames.

17. The hereindescribed car truck comprising a pair of four wheel trucks, each of which includes a pair of wheel carrying axles, and a pair of separately formed and independently acting side frames, and a center bolster yieldingly supported by said pair of trucks.

In testimony whereof I hereunto affix my signature this 26th day of December, 1917.

CHARLES F. FREDE.